July 22, 1941.　　　H. BRAMMER　　　2,249,726
LAMINATED DRIVING BELT
Filed June 11, 1940
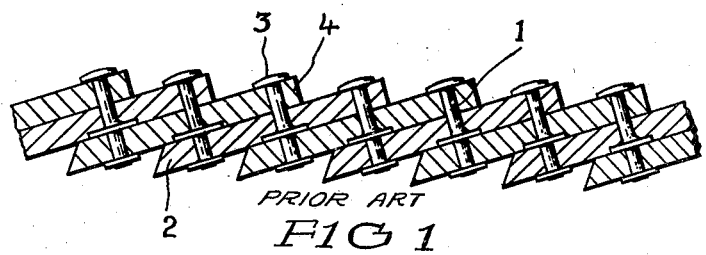
PRIOR ART
FIG 1
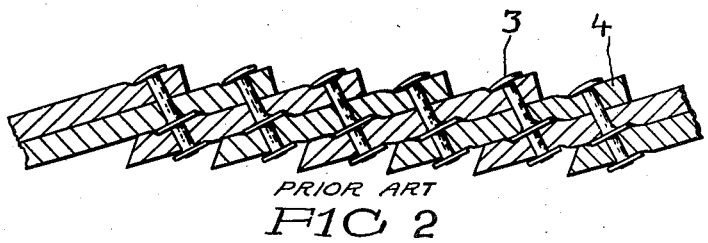
PRIOR ART
FIG 2
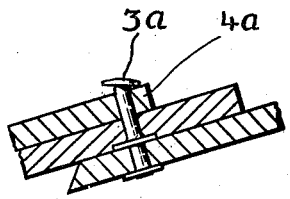 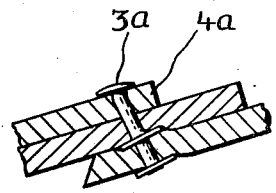
FIG 3　　　FIG 4
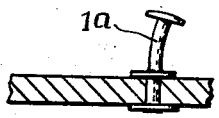 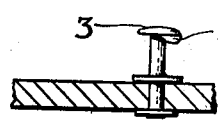 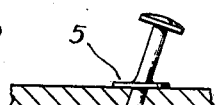
FIG 5　FIG 6　FIG 7
Inventor
Harry Brammer
by
Potter, Pierce & Scheffler
his attorneys Patented July 22, 1941

2,249,726

UNITED STATES PATENT OFFICE 2,249,726

LAMINATED DRIVING BELT

Harry Brammer, Leeds, England

Application June 11, 1940, Serial No. 339,988
In Great Britain July 26, 1939

4 Claims. (Cl. 74—232)

This invention relates to laminated driving belts of the kind comprising a number of superimposed detachable links formed from pieces of leather, rubber or similar material, and secured together by studs, one end of which is riveted to a link whilst the other end carries a detachable or integral head, which is passed through holes in the adjacent link or links.

One well known form of belting of this kind comprises links to which the studs are attached at one end, the links having holes or slots at one or more positions along their length, which may or may not be joined by slits extending between the holes. The links are assembled by passing the headed studs through intermediate holes in the adjacent link or links (depending upon the number of laminations of the belt), and through the end hole in the outermost link, namely that hole furthest away from the link to which the stud is riveted.

In laminated belting, any fastening elements and especially studs where these are used, tend to assume an inclined position when the belt is under tensional load, so that part of the periphery of the head is caused to bind against the surface of the outermost and/or innermost link, which eventually may result in wear of the link surface by cutting or fraying.

Assuming a length of laminated belt to be under tension, the normal tendency is for the innermost and outermost links to move away from each other in opposite directions, this tendency being controlled by the fastening element, one end of which is riveted to one of the two links, and the other carrying the head butting up against the end hole in the other link. This means that the fastening element is inclined with the head towards the centre of the link upon which it bears, and that binding therefore takes place on that part of the hole or slot which is away from the end of such link. This part is thus subject to the greatest pressure, and is the most liable to wear.

In some constructions of laminated belting which do not employ studs riveted to the links, washers have been used in conjunction with rivets or nuts and bolts, to prevent the head from digging into the links. One special form of washer can be detached from the fastening element without necessitating the dismantling thereof, and is therefore suited especially for use with integral headed studs.

I have found that whilst washers as above-mentioned may prove perfectly satisfactory in use, it is possible to dispense with such washers, and yet prevent damage to the link on which the stud head bears, and the present invention is therefore concerned with this feature.

According to my invention, laminated belting connected by studs riveted to one of the links, is characterised by the head of the stud being canted downwards towards the end of the link on which it bears. This may be effected by bending or inclining the shank of the stud away from the end of the link to which it is riveted, either before or after riveting it to the link. The degree of bending to produce the necessary cant on the head of the stud is not great, and is determined by the amount of inclination which the studs normally tend to assume under load. If the degree of canting of the stud heads is approximately the same as the degree of inclination of the stud shanks when the belt is under load, the result will be that the heads will be lying flat on the belt in use, although when not under load, they will tend to be canted slightly towards the end of the link on which the head bears.

Various examples of how the invention may be carried into effect will now be described with reference to the accompanying drawing, in which:

Fig. 1 shows a length of ordinary laminated belting in section when not under load, Fig. 2 shows the same length of belting as illustrated in Fig. 1, when under load, showing the tendency for the stud heads to dig into the surface of the links.

Fig. 3 shows belting modified in accordance with the present invention when not under load, and Fig. 4 shows the belting of Fig. 3 when loaded, Fig. 5 shows another link in which the shank of the stud is bent, Fig. 6 shows a modified link in which the head of the stud is deformed without bending the shank, and Fig. 7 shows yet a further modification where the stud is set at an angle in the link.

Referring to Fig. 1, it can be seen that the studs 1, which are riveted to the ends 2 of the respective links, pass through these links at right angles thereto and, when the belt is at rest, the stud heads 3 lie flat on the end portion 4 of the outermost links. When such belting is under tension as shown in Fig. 2, there is a tendency for the bottom and top link of each section of the belt to move away from each other so that the stud head 3 tends to dig into the end of the belt 4 and, in time, to wear it away. Fig. 3 shows a similar length of belting modified in accordance with the invention by canting the stud heads 3a. In this case the head 3a of the stud is bent over and appears to be digging into the end 4a of the top link; since, however, the belting is not under load, this will not do any damage, and when the belting is under load, as illustrated in Fig. 4, the pull on the stud will cause the stud head 3a to lie flat on the surface of the belt and there will thus be little or no tendency for this surface to be worn.

The canting of the studs may be performed either by bending the shanks 1a at some point intermediate the head 3 and the part where they are riveted to the link, as shown in Fig. 5, or by bending or deforming the heads of the studs only, for instance, by forming a lump or boss 3b on the underside of one edge of the head 3, as shown in Fig. 6. Alternatively, an inclined shoulder 5 may be formed on the stud where the latter is riveted to the link and a similarly inclined washer 6 fitted on the stud at the opposite side of the link where the latter is burred over for riveting, as shown in Fig. 7.

Any of the above expedients will result in the head of the stud having the necessary inclination.

It is to be understood that with inclined studs or stud heads according to the present invention, when the belt is not under load, the heads of the studs will apparently be digging into the end of the link on which they bear. This digging in will not damage the links, since it only occurs when there is no load on the belt. Directly a load is put on to the belt, the innermost and outermost links, as described above, tend to move away in opposite directions, whereupon the head of the stud becomes level in respect to the belt, and sits flatly upon the link on which it bears, thus obviating the necessity for a washer under the stud head.

I claim:

1. Laminated driving belting of the kind comprising a number of links arranged in overlapping relation and secured together by studs, one end of which is riveted to a link, whilst the other end carries a detachable or integral head, which is passed through a hole in an adjacent link, characterised by the head of each stud being canted downwards towards the end of the link on which it bears.

2. Laminated driving belting as claimed in claim 1, in which the canting of the stud head is effected by bending the shank of the stud at some point along its length.

3. Laminated belting as claimed in claim 1, in which the canting of the stud head is performed by bending the head portion only with respect to the shank portion.

4. Laminated belting as claimed in claim 1, wherein the canting of the stud head is performed by deforming the head of the stud as by means of a boss on the underside of one edge of the head.

HARRY BRAMMER.